(12) United States Patent
Agarwal

(10) Patent No.: US 8,391,833 B2
(45) Date of Patent: Mar. 5, 2013

(54) SYSTEMS, METHODS, AND COMPUTER READABLE MEDIA FOR DIAMETER ROUTING WITH NUMBER PORTABILITY CORRECTION

(75) Inventor: Devesh Agarwal, Raleigh, NC (US)

(73) Assignee: Tekelec, Inc., Morrisville, NC (US)

( * ) Notice: Subject to any disclaimer, the term of this patent is extended or adjusted under 35 U.S.C. 154(b) by 15 days.

(21) Appl. No.: 13/205,184

(22) Filed: Aug. 8, 2011

(65) Prior Publication Data

US 2012/0034900 A1   Feb. 9, 2012

Related U.S. Application Data

(60) Provisional application No. 61/371,720, filed on Aug. 8, 2010.

(51) Int. Cl.
*H04M 11/00*   (2006.01)

(52) U.S. Cl. .................. 455/406; 455/405; 379/114.27

(58) Field of Classification Search .......... 455/405–409, 455/445; 379/114.27, 115.01, 115.03; 370/401, 370/352–356
See application file for complete search history.

(56) References Cited

U.S. PATENT DOCUMENTS

| | | | |
|---|---|---|---|
| 5,799,073 A | 8/1998 | Fleischer, III et al. |
| 5,802,145 A | 9/1998 | Farris et al. |
| 5,903,726 A | 5/1999 | Donovan et al. |
| 5,915,222 A | 6/1999 | Olsson et al. |
| 5,995,822 A | 11/1999 | Smith et al. |
| 6,185,414 B1 | 2/2001 | Brunner et al. |
| 6,188,752 B1 | 2/2001 | Lesley |
| 6,208,872 B1 | 3/2001 | Schmidt |
| 6,351,453 B1 | 2/2002 | Nolting et al. |
| 6,373,930 B1 | 4/2002 | McConnell et al. |
| 6,393,269 B1 | 5/2002 | Hartmaier et al. |
| 6,430,277 B1 | 8/2002 | Roadifer et al. |
| 6,453,158 B2 | 9/2002 | Donovan et al. |
| 6,480,588 B1 | 11/2002 | Donovan |
| 6,496,690 B1 | 12/2002 | Cobo et al. |
| 6,516,194 B2 | 2/2003 | Hanson |
| 6,535,727 B1 | 3/2003 | Abbasi et al. |
| 6,584,183 B2 | 6/2003 | Manto |

(Continued)

FOREIGN PATENT DOCUMENTS

| | | |
|---|---|---|
| CN | ZL 200780017383.1 | 11/2011 |
| GB | 2 382 267 | 5/2003 |

(Continued)

OTHER PUBLICATIONS

Non-Final Official Action for U.S. Appl. No. 11/586,488 (Jul. 15, 2011).

(Continued)

*Primary Examiner* — Sharad Rampuria
(74) *Attorney, Agent, or Firm* — Jenkins, Wilson, Taylor & Hunt, P.A.

(57) ABSTRACT

Methods, systems, and computer readable media for DIAMETER routing with portability correction are disclosed. According to one aspect, the subject matter described herein includes a method for providing number portability correction for DIAMETER signaling involving a subscriber of a communications network. The method includes receiving a DIAMETER signaling message directed to an Online Charging System (OCS) and accessing a number portability database using the called party identifier in the signaling message, to identify if the called party has a ported number. The method further includes, in response to determining the called party has a ported number, modifying the signaling message to include results from or derived from the access to the number portability database, and routing the modified message to the OCS.

28 Claims, 4 Drawing Sheets

U.S. PATENT DOCUMENTS

| | | | |
|---|---|---|---|
| 6,633,764 B1 | 10/2003 | Garcia | |
| 6,694,153 B1 | 2/2004 | Campbell et al. | |
| 6,801,781 B1 | 10/2004 | Provost et al. | |
| 6,856,676 B1 | 2/2005 | Pirot et al. | |
| 6,975,852 B1 | 12/2005 | Sofer et al. | |
| 7,181,194 B2 | 2/2007 | McCann et al. | |
| 7,254,391 B2 | 8/2007 | McCann | |
| 7,310,415 B1 | 12/2007 | Short | |
| 7,333,809 B2 | 2/2008 | Engelhart | |
| 7,346,022 B1 | 3/2008 | Roy | |
| 7,466,807 B2* | 12/2008 | McCann et al. | 379/114.2 |
| 7,729,485 B2* | 6/2010 | Koskinen et al. | 379/115.01 |
| 7,764,947 B2* | 7/2010 | Koskinen et al. | 455/405 |
| 7,855,982 B2* | 12/2010 | Ramankutty et al. | 370/259 |
| 7,876,744 B2* | 1/2011 | Kwon | 370/353 |
| 7,916,857 B2* | 3/2011 | Palmer et al. | 379/229 |
| 7,936,866 B2 | 5/2011 | McCann | |
| 8,139,735 B2* | 3/2012 | Cai et al. | 379/114.01 |
| 8,213,411 B2* | 7/2012 | Ayers et al. | 370/352 |
| 2002/0029189 A1 | 3/2002 | Titus et al. | |
| 2002/0071530 A1 | 6/2002 | Hannigan | |
| 2002/0111153 A1 | 8/2002 | Hartmaier et al. | |
| 2002/0150079 A1 | 10/2002 | Zabawskyj et al. | |
| 2003/0091170 A1 | 5/2003 | McCann et al. | |
| 2003/0142803 A1 | 7/2003 | Freedman et al. | |
| 2003/0190913 A1 | 10/2003 | Coad et al. | |
| 2003/0203740 A1 | 10/2003 | Bahl et al. | |
| 2004/0166878 A1 | 8/2004 | Erskine et al. | |
| 2004/0176086 A1 | 9/2004 | Chatterjee et al. | |
| 2004/0184594 A1 | 9/2004 | Schmechel et al. | |
| 2004/0203641 A1 | 10/2004 | Hazlewood | |
| 2004/0213393 A1 | 10/2004 | Bedingfiled et al. | |
| 2004/0233840 A1 | 11/2004 | Bye | |
| 2004/0240638 A1 | 12/2004 | Donovan | |
| 2006/0020680 A1 | 1/2006 | Emberty et al. | |
| 2006/0025114 A1 | 2/2006 | Bales et al. | |
| 2006/0050680 A1 | 3/2006 | Naim et al. | |
| 2006/0240819 A1 | 10/2006 | Xu et al. | |
| 2006/0252425 A1 | 11/2006 | Jiang | |
| 2006/0258329 A1 | 11/2006 | Gruchala et al. | |
| 2006/0291486 A1 | 12/2006 | Cai et al. | |
| 2007/0042779 A1 | 2/2007 | Eikkula | |
| 2007/0047539 A1 | 3/2007 | Agarwal et al. | |
| 2007/0127647 A1 | 6/2007 | Russell | |
| 2007/0263565 A1 | 11/2007 | Roy | |
| 2007/0286367 A1 | 12/2007 | McCann et al. | |
| 2008/0160954 A1 | 7/2008 | Agarwal et al. | |
| 2011/0075675 A1* | 3/2011 | Koodli et al. | 370/401 |
| 2012/0099715 A1* | 4/2012 | Ravishankar et al. | 379/114.01 |

FOREIGN PATENT DOCUMENTS

| | | | |
|---|---|---|---|
| WO | WO 01/22761 | | 3/2001 |
| WO | WO 02/054786 | A1 | 7/2002 |
| WO | WO 03/017697 | A1 | 2/2003 |
| WO | WO 03/103265 | A1 | 12/2003 |
| WO | WO 2005/089119 | A2 | 6/2005 |
| WO | WO 2006/031678 | A2 | 3/2006 |
| WO | WO 2007/050589 | A2 | 5/2007 |
| WO | WO 2007/106563 | A2 | 9/2007 |
| WO | WO 2008/085432 | A1 | 7/2008 |

OTHER PUBLICATIONS

Notice of Allowance for Chinese Patent Application No. 200780017383.1 (Jun. 24, 2011).
Extended European Search Report for European Application No. 05724466.7 (Jun. 20, 2011).
Interview Summary for U.S. Appl. No. 11/586,488 (May 6, 2011).
Non-Final Official Action for U.S. Appl. No. 11/586,488 (Jan. 31, 2011).
First Office Action for Chinese Patent Application No. 200780017383.1 (Dec. 31, 2010).
Notice of Allowance and Fee(s) Due for U.S. Appl. No. 11/807,691 (Dec. 23, 2010).
Final Official Action for U.S. Appl. No. 11/890,299 (Dec. 9, 2010).
Non-Final Official Action for U.S. Appl. No. 11/890,299 (Apr. 15, 2010).
Final Official Action for U.S. Appl. No. 11/807,691 (Dec. 7, 2009).
Non-Final Official Action for U.S. Appl. No. 11/807,691 (Apr. 2, 2009).
Declaration of Gregory A. Hunt (Dec. 15, 2008).
Communication of European publication number and information on the application of Article 67(3) EPC for European Application No. 07753190.3 (Nov. 12, 2008).
Notification of Transmittal of the International Search Report and the Written Opinion of the International Searching Authority, or the Declaration for International Application No. PCT/US07/06543 (Aug. 29, 2008).
Final Official Action for U.S. Appl. No. 11/807,691 (Aug. 21, 2008).
Notice of Allowance and Fee(s) Due for U.S. Appl. No. 11/724,590 (Aug. 14, 2008).
Notification of Transmittal of the International Search Report and the Written Opinion of the International Searching Authority, or the Declaration for International Application No. PCT/US07/26232 (May 15, 2008).
Interview Summary for U.S. Appl. No. 11/807,691 (Apr. 11, 2008).
Non-Final Official Action for U.S. Appl. No. 11/807,691 (Dec. 21, 2007).
Notification of Transmittal of the International Search Report and the Written Opinion of the International Searching Authority, or the Declaration for International Application No. PCT/US06/41449 (Jun. 20, 2007).
Notice of Allowance and Fee(s) Due for U.S. Appl. No. 11/070,940 (May 11, 2007).
Final Official Action for U.S. Appl. No. 11/070,940 (Mar. 9, 2007).
Notification of European publication number and Information on the application of Article 67(3) EPC for European Application No. 05724466.7 (Nov. 22, 2006).
Notification of Transmittal of the International Search Report and the Written Opinion of the International Searching Authority, or the Declaration in International Application No. PCT/US05/06926 (Oct. 11, 2006).
Non-Final Official Action for U.S. Appl. No. 11/070,940 (Jun. 20, 2006).
"Prepaid vs. Number Portability," Power Point presentation (publication date unknown; electronic file creation date Jul. 29, 2003.).
"Description of the SMS Prepaid Relay Function Implemented in the SRF Equipment," edition 0.1, unpublished, dated Jul. 2001.
Communication pursuant to Article 94(3) EPC for European Application No. 05 724 466.7 (Apr. 10, 2012).
First Office Action for Chinese Patent Application No. 200780051876.7 (Mar. 7, 2012).
Second Office Action for Chinese Patent Application No. 200780051876.7 (Dec. 5, 2012).

* cited by examiner

SYSTEMS, METHODS, AND COMPUTER READABLE MEDIA FOR DIAMETER ROUTING WITH NUMBER PORTABILITY CORRECTION

PRIORITY CLAIM

This application claims the benefit of U.S. Provisional Patent Application Serial No. 61/371,720, filed Aug. 8, 2010, the disclosure of which is incorporated herein by reference in its entirety.

TECHNICAL FIELD

The subject matter described herein relates to methods and systems for number portability in a communications network. More particularly, the subject matter described herein relates to systems, methods, and computer readable media for DIAMETER routing with portability correction.

BACKGROUND

In traditional mobile calling plans, mobile subscribers place calls to other subscribers and are billed at the end of each billing period for each call placed during that period. Calls may be billed based on a variety of factors, such as length of each call and the type of call (i.e., voice, video, text message, long-distance, local, etc.). However, in recent years, mobile network operators have also offered prepaid calling plans to mobile subscribers where subscribers pay for calls in advance of placing the calls by setting aside a prepaid credit amount dedicated to paying for prepaid calls. Prepaid calling plans then use this prepaid credit amount associated with each prepaid mobile subscriber to determine, before connecting each call, whether the subscriber possesses enough prepaid credit to place the call. Upon completing the call, the subscriber's prepaid account is debited for the call.

Many network operators offer different charging rates for communications between in-network subscribers (i.e., both the calling subscriber and the called subscriber belong to the same network) and communications involving out-of-network subscribers. For example, some service providers offer unlimited, free in-network calls. In other plans, in-network calls may be billed at a lower rate than out of network calls. Therefore, ascertaining the network to which a subscriber belongs is important in appropriately charging prepaid customers for their communications.

In a DIAMETER network, CreditControlRequest (CCR) and CreditControlAnswer (CCA) messages are used for a number of purposes, such as for obtaining credits for prepaid-type services, as well as in policy control. In a prepaid call scenario, a CCR message is sent from the node providing service (e.g., IMS S-CSCF) to the prepaid subscriber to an Online Charging System (OCS) to request permission to provide the service and deduct the necessary credits from the subscriber's balance. A CCR message will include a calling party identifier, such as an IMSI or IMS private identify (IMPI), and a called party identifier, such as an MSISDN. The OCS will use these identifiers to determine the rate at which the prepaid subscriber should be charged.

Typically, a network operator will be assigned a range or set of ranges of MSISDNs for the operator's subscribers, and a subscriber's network operator can be identified based on a portion of the subscriber's MSISDN. However, subscribers are now allowed to change network operators and keep the same MSISDN number, by porting out or transferring their existing number to a different network operator. These ported numbers and associated routing information are maintained in a number portability database. Thus, a subscriber's network operator cannot be accurately identified by the subscriber's MSISDN alone, because the number portability database must be checked.

One problem associated with charging prepaid and non-prepaid subscribers occurs if a subscriber has ported his or her number to a current network provider and/or is communicating with another subscriber having a ported number, the OCS may not know the number(s) have been ported and may charge the subscribers incorrectly for their calls. Accordingly, there exists a need for systems, methods, and computer readable media for DIAMETER routing with portability correction.

SUMMARY

The subject matter described herein includes methods, systems, and computer readable media for DIAMETER routing with number portability correction. One exemplary method includes receiving a DIAMETER signaling message directed to an Online Charging System (OCS) and accessing a number portability database using the called party identifier in the signaling message, to identify if the called party has a ported number. The method further includes, in response to determining the called party has a ported number, modifying the signaling message to include results from or derived from the number portability lookup, and routing the modified message to the OCS.

According to another aspect, the subject matter described herein includes a method for providing number portability correction to in-network communications involving a subscriber in a DIAMETER network. The method includes receiving a DIAMETER signaling message directed to an Online Charging System (OCS) and performing a lookup in a number portability database using the called party identifier in the signaling message, to identify if the called party has a ported number. The method further includes determining if the called party and calling party are subscribers of the same communications network, and, in response to determining that the called party and the calling party are subscribers of the same communications network, responding to the requesting node to continue providing service to the subscriber.

According to another aspect, the subject matter described herein includes a method for providing number portability correction in a DIAMETER network. The method includes receiving a DIAMETER signaling message, such as a DIAMETER Credit Control Request (CCR) message, that includes a subscriber identifier, such as a MSISDN identifier. The MSISDN identifier is extracted from the DIAMETER message and used to query a number portability database. In the event that the MSISDN is ported, the number portability database is adapted to return information that identifies the ported-to network, such as a location routing number (LRN), realm identifier, domain identifier, etc. The ported-to network identifying information, or information derived from it, is then placed in a DIAMETER answer message, such as a Credit Control Answer (CCA) message, that is associated with the received CCR message. The DIAMETER CCA message containing the ported-to network information is then communicated to the originator of the DIAMETER CCR message.

The subject matter described herein for DIAMETER routing with portability correction may be implemented in software in combination with hardware and/or firmware. As such, the terms "function" or "module" as used herein refer to software in combination with hardware and/or firmware for implementing the feature being described. For example, the subject matter described herein can be implemented in software executed by a processor. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media are provided for DIAMETER routing with number portability correction. Reference will now be made in detail to exemplary embodiments of the present subject matter, examples of which are illustrated in the accompanying drawings. Wherever possible, the same reference numbers will be used throughout the drawings to refer to the same or like parts.

Figure 1:
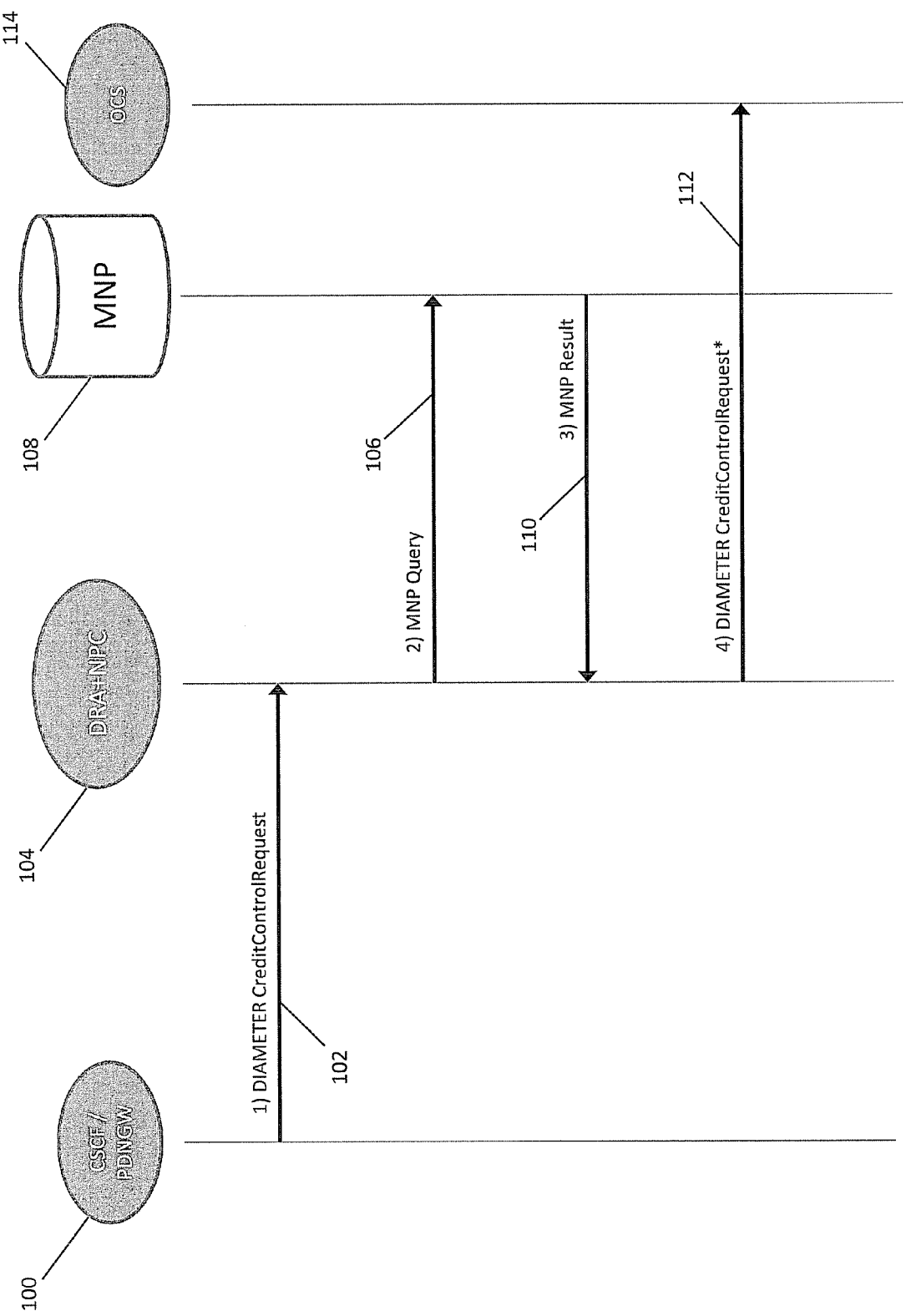
FIG. 1 is a signaling message flow diagram illustrating exemplary DIAMETER signaling messages communicated between a CSCF or PDN gateway and an OCS according to an embodiment of the subject matter described herein.

FIG. 1 is a signaling message flow diagram illustrating exemplary DIAMETER signaling messages communicated between a call session control function (CSCF) or packet data network (PDN) gateway and an OCS according to an embodiment of the subject matter described herein. CSCF or PDN gateway 100 provides service to a subscriber, such as a prepaid subscriber, of a communications network. CSCF 100 provides connectivity to other packet networks and is responsible for managing the session and determining if the subscriber has enough credit for a requested service prior to giving the subscriber access to the network service. To accomplish this, in step 1, CSCF 100 may send DIAMETER CreditControlRequest (CCR) 102, directed to online charging system (OCS) 114. CCR 102 may include information, such as a called party identifier, a calling party identifier, and a service type. The called party identifier may be in the form of a mobile station ISDN number (MSISDN). The calling party identifier may be in the form of an International Mobile Station Identifier (IMSI). The IMSI may include a Mobile Country Code (MCC) identifier and a Mobile Network Code (MNC) identifier. If the subscriber is a prepaid subscriber, OCS 114 is responsible for authorizing or denying service based on the prepaid credit balance of the prepaid subscriber and for setting charging rates for non-prepaid subscribers. OCS 114 may use local policy and rating functions to determine the rate to charge for each event or service. However, at this point, CSCF 100 may not know if the called party has ported his or her number from one service provider to another, and if CCR 102 were to go directly to OCS 114, the prepaid subscriber (i.e. the calling party) may not be charged correctly for the call. To ensure the prepaid subscriber is appropriately charged, DIAMETER Routing Agent (DRA) with Number Portability Correction (NPC) 104 may receive or intercept CCR 102 on its way to OCS 114. DRA 104 may include, but is not limited to, a DIAMETER signaling router or other DIAMETER agent such as a relay agent, a re-direct agent, or a translation agent or proxy agent. Upon receiving CCR 102, DRA 104 may extract the called party identifier and, in step 2, perform a number portability lookup in a number portability database, such as Mobile Number Portability (MNP) database 108. MNP database 108 contains routing information for mobile subscribers who have ported their numbers, e.g., transferred their numbers from one mobile service provider to another service provider. Alternatively, MNP database 108 may be a service portability database, for example.

The subject matter described herein is not limited to accessing a mobile number portability database. DRA 104 may include or have access to any type of database that contains ported-to network identifying information for any type of ported subscribers. For example, database 108 may include number portability data for wireline subscribers (e.g., local number portability (LNP) data) in addition to or instead of number portability data for mobile subscribers.

In one embodiment, MNP database 108 may be co-located or integrated with DRA 104. In another embodiment, MNP database 108 may be located on a node or network element that is separate from DRA 104, including, but not limited to, a service control point (SCP) or an application server (AS) node, which may operate, for example, as a SIP application server or DIAMETER application server. In step 3, MNP database 108 returns MNP result 110 to DRA 104. DRA 104 may analyze MNP result 110 to determine if the called party number or identifier has been ported.

The subject matter described herein is not limited to receiving the CCR message from a CSCF or PDN gateway. In an alternate embodiment, the CCR message may be received from a SIP application server.

In response to determining that the called party number has been ported, in step 4, DRA 104 may modify CCR 102, forming CCR message 112, which includes information from or derived from the number portability lookup, in addition to the called party MSISDN. The information from or derived from the number portability lookup may include a routing number, a destination realm, a service provider identifier, or any other information suitable for identifying the network or service provider that serves the called party. If MNP result 110 is in the form of a location routing number (LRN), DRA 104 may translate the LRN to a destination realm or service provider identifier appropriate for use in DIAMETER CCR message 112. If the called party number has not been ported, DRA 104 may pass the original, unmodified CCR 102 message to OCS 114. Alternatively, DRA 104 may create a new CCR message identifying itself as the Origin_Host and having essentially the same payload as CCR 102 or CCR 112, to send to OCS 114. OCS 114 now has accurate information regarding the service provider of which the called party is a subscriber and may determine the appropriate rate to charge the prepaid subscriber for the call. OCS 114 may return this information to DRA 104 or CSCF 100 using a DIAMETER CreditControlAnswer (CCA) message (not shown).

Figure 2:
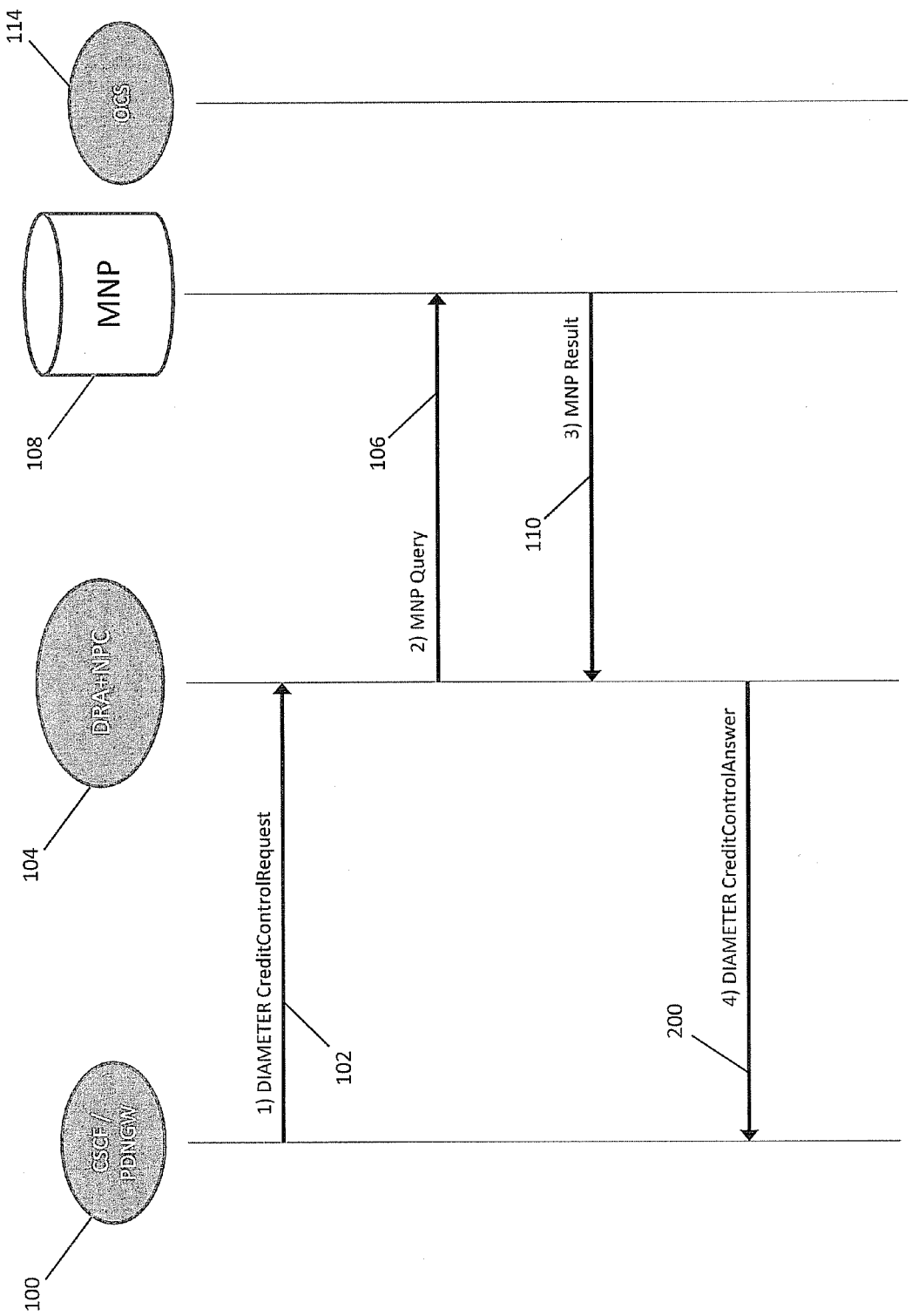
FIG. 2 is a signaling message flow diagram illustrating exemplary DIAMETER signaling messages communicated between a CSCF or PDN gateway and a DIAMETER routing agent according to an embodiment of the subject matter described herein.

FIG. 2 is a signaling message flow diagram illustrating exemplary DIAMETER signaling messages communicated between a CSCF or PDN gateway and a DIAMETER routing agent according to an embodiment of the subject matter described herein. Steps 1-3 of FIG. 2 are identical to steps 1-3 of FIG. 1, and so their descriptions will not be repeated. The difference between FIG. 1 and FIG. 2 occurs at step 4, where DRA 104 receives MNP result 110 and determines that the called party and the calling party are both subscribers of the same network, i.e., that the call is an "in-network" call. In this embodiment, the policy of the service provider may be that in-network calls are free of charge. Thus, there is no need to contact OCS 114 to determine if the prepaid subscriber has sufficient credit for the call or to determine at what rate to charge the prepaid subscriber. Therefore, at step 4, DRA 104 may respond to CSCF 100 with CCA 200, instructing CSCF 100 to proceed with providing the requested service to the prepaid subscriber, and thereby shielding OCS 114 from unnecessary signaling messages and CCR processing. It should be noted that the example described above applies equally to non-prepaid subscribers where the service provider allows free calling between or involving non-prepaid subscribers of the same network.

Figure 3:
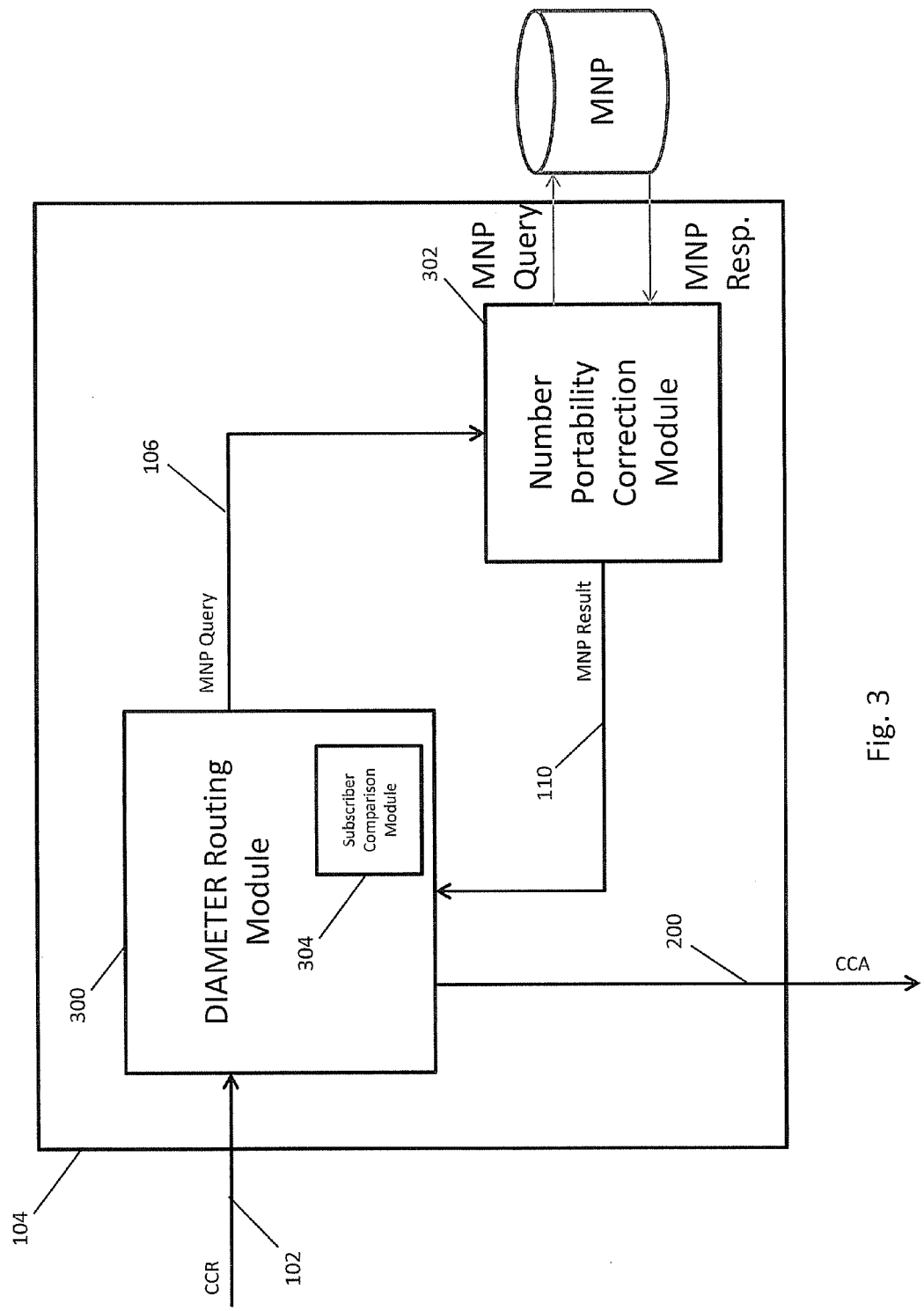
FIG. 3 is a block diagram illustrating an exemplary DIAMETER routing agent with number portability correction according to an embodiment of the subject matter described herein.

FIG. 3 is a block diagram illustrating an exemplary DIAMETER routing agent with number portability correction according to an embodiment of the subject matter described herein. DRA 104 includes DIAMETER routing module 300 and number portability correction (NPC) module 302. DRA 104 may also include subscriber comparison module 304, which may be included in DIAMETER routing module 300. As described above, CCR 102 may be intercepted by DRA 104 and may be passed to DIAMETER routing module 300. DIAMETER routing module 300 may generate MNP query 106 via NPC module 302. NPC module 302 may include a number portability database or may query an external number portability database. For example, NPC module 302 may query MNP database 108 to determine whether the called party number and/or the calling party number has been ported. The result of the MNP query may be a routing number (RN) for the called and/or calling party number if either or both have been ported. If neither number has been ported, then the result may include an indication that the numbers are not ported. NPC module 302 formulates MNP result 110 for DIAMETER routing module 300. In one embodiment, subscriber comparison module 304 may analyze MNP result 110 to determine if the called party and the calling party are subscribers of the same network. This determination may be made by comparing the routing numbers (RNs) if both numbers are ported. If one or the other is ported, this determination may be made by comparing the RN of the ported number with a portion of the MSISDN or IMSI that identifies the service provider of the other number. If neither is ported, this determination may be made by comparing the portions of the MSISDN or IMSI numbers that identify the service providers. If the called and calling party are subscribers of the same network, DIAMETER routing module 300 may send CCA 200 to CSCF 100. Alternatively, DIAMETER routing module 300 may modify CCR 102 and route CCR 112 to OCS 114, or, if the called party number was not ported, may simply route the unmodified CCR 102 to OCS 114.

Figure 4:
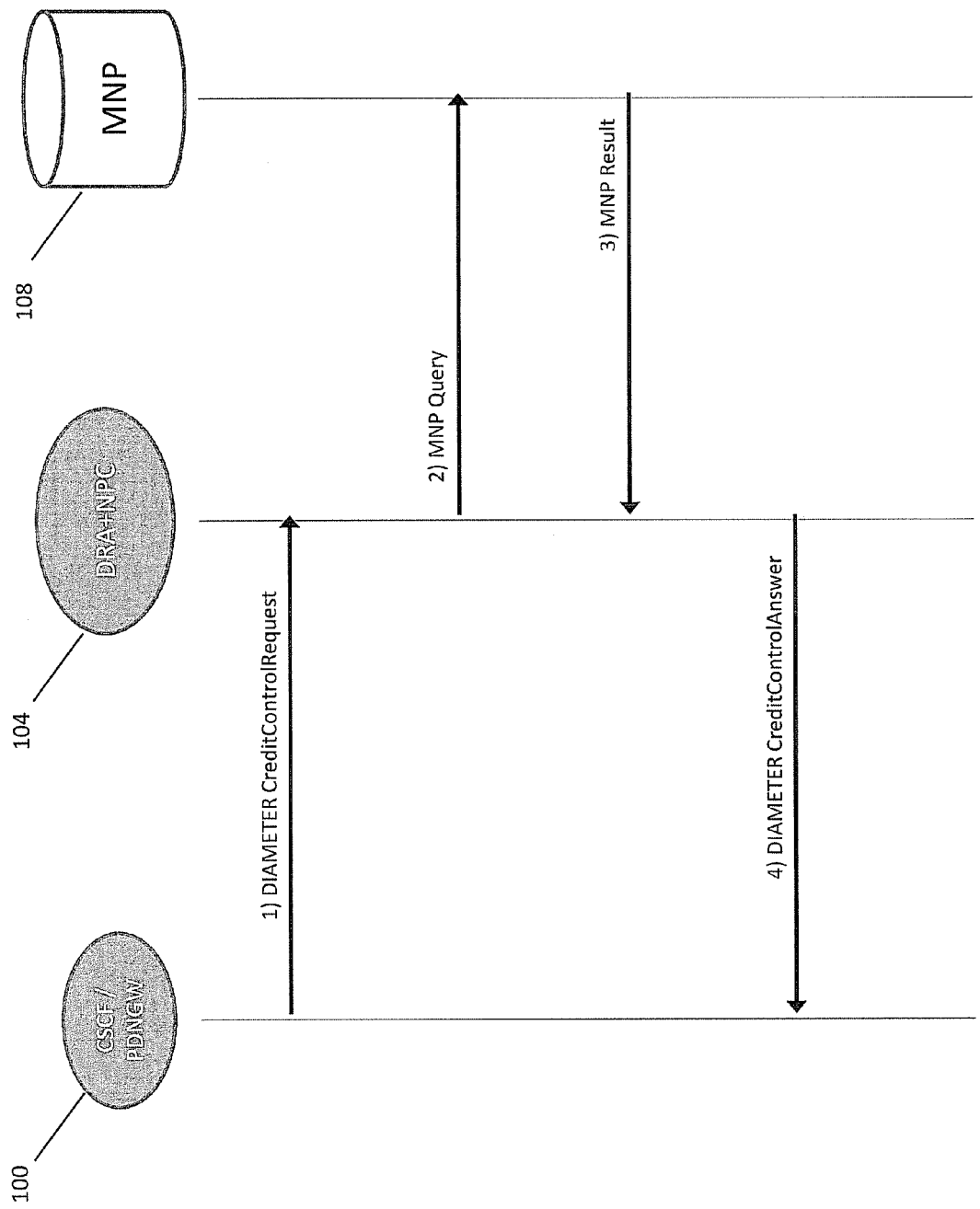
FIG. 4 is a message flow diagram illustrating the usage of a DIAMETER CCR message to trigger a number portability lookup according to an embodiment of the subject matter described herein.

According to another aspect of the subject matter described herein, the DIAMETER CCR/CCA procedure may be used to trigger a number portability lookup. FIG. 4 is a message flow diagram illustrating the use of the DIAMETER CCR/CCA procedure to trigger a number portability lookup according to an embodiment of the subject matter described herein. Referring to FIG. 4, in line 1, CSCF/PDN gateway 100 sends a DIAMETER credit control quest to DIAMETER routing agent with number portability correction capabilities 104. The credit control request may include the IMSI of the calling subscriber as well as the MSISDN of the called subscriber. In response to the request, DRA 104 may automatically perform a number portability lookup, as indicted by line 2 of the message flow diagram. MNP 108 returns an MNP result including number portability information for the called and/or calling party, as indicated in line 3. If the called and/or calling party has been ported, the number portability information may include an LRN, a country code, mobile network code, or other indicator of the ported-to network or domain. If the called and/or calling party has not been ported, the number portability information returned by MNP 108 may include a "not ported" indicator. In line 4, DRA 104 returns a DIAMETER credit control answer message to CSCF/PDN GW 100. The CCA message may include any number portability data received from MNP 108 in modified or unmodified form. For example, DRA 104 may simply pass the number portability information, such as the LRN or country code, to CSCF/PDN GW 100 in the same format received from MNP 108. In an alternate implementation, DRA 104 may translate the received number portability information into DIAMETER routing information, such as a realm identifier.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for providing number portability correction for DIAMETER signaling involving a subscriber of a communications network, the method comprising:
   at a DIAMETER routing agent:
   receiving a DIAMETER signaling message from a network node providing a network service to the subscriber and directed to an Online Charging System (OCS), wherein the DIAMETER signaling message includes a called party identifier;
   accessing a number portability database to determine whether the called party identifier has been ported;
   in response to determining that the called party identifier has been ported, modifying the DIAMETER signaling message to include results from or derived from the access to the number portability database, wherein modifying the DIAMETER signaling message to include results from or derived from the access to the number portability database includes translating a routing number obtained in the access to the number portability database into a destination realm identifier and inserting the destination realm identifier in the DIAMETER signaling message; and
   routing the modified DIAMETER signaling message to the OCS.

2. The method of claim 1 wherein receiving a DIAMETER signaling message includes receiving a DIAMETER credit control request (CCR) message.

3. The method of claim 1 wherein the DIAMETER routing agent comprises at least one of a DIAMETER signaling router, a DIAMETER redirect agent, a DIAMETER proxy agent, and a DIAMETER translation agent.

4. The method of claim 1 wherein the number portability database is located on the same computing platform as the DIAMETER routing agent.

5. The method of claim 1 wherein the number portability database is located on a computing platform that is separate from a computing platform on which the DIAMETER routing agent is located.

6. The method of claim 1 wherein modifying the DIAMETER signaling message to include results from or derived from the access to the number portability database includes inserting the routing number (RN) identifying a ported-to network in the DIAMETER signaling message.

7. A method for providing number portability correction to in-network communications involving a subscriber of a communications network, the method comprising:
   at a DIAMETER routing agent:
      receiving a DIAMETER signaling message from a network node providing a network service to the subscriber and directed to an Online Charging System (OCS), wherein the DIAMETER signaling message includes a called party identifier and a calling party identifier;
      in response to receiving the DIAMETER signaling message, accessing a number portability database to determine whether the called party identifier has been ported;
      determining whether the called party and the calling party are subscribers of the same communications network; and
      in response to determining that the called party and the calling party are subscribers of the same communications network, responding to the network node to continue providing service to the subscriber.

8. The method of claim 7 wherein receiving a DIAMETER signaling message includes receiving a DIAMETER credit control request (CCR) message.

9. The method of claim 7 wherein the DIAMETER routing agent comprises at least one of a DIAMETER signaling router, a DIAMETER redirect agent, a DIAMETER proxy agent, and a DIAMETER translation agent.

10. The method of claim 7 wherein the number portability database is located on the same computing platform as the DIAMETER routing agent.

11. The method of claim 7 wherein the number portability database is located on a computing platform that is separate from a computing platform on which the DIAMETER routing agent is located.

12. A system for providing number portability correction to communications involving a subscriber of a communications network, the system comprising:
   a DIAMETER routing agent comprising:
      a DIAMETER routing module, configured for receiving a DIAMETER signaling message from a network node providing a network service to the subscriber and directed to an Online Charging System (OCS), wherein the DIAMETER signaling message includes a called party identifier and for routing DIAMETER signaling messages; and a number portability correction module, configured for:
         accessing a number portability database to determine whether the called party identifier has been ported; and
         in response to determining that the called party identifier has been ported, modifying the DIAMETER signaling message to include information from or derived from the accessing of the number portability database, wherein modifying the DIAMETER signaling message to include results from or derived from the access to the number portability database includes translating a routing number obtained in the access to the number portability database into a destination realm identifier and inserting the destination realm identifier in the DIAMETER signaling message.

13. The system of claim 12 wherein the DIAMETER signaling message comprises a DIAMETER credit control request (CCR) message.

14. The system of claim 12 wherein the DIAMETER routing agent comprises at least one of a DIAMETER signaling router, a DIAMETER redirect agent, a DIAMETER proxy agent, and a DIAMETER translation agent.

15. The system of claim 12 wherein the number portability database is located on the same computing platform as the DIAMETER routing agent.

16. The system of claim 12 wherein the number portability database is located on a computing platform that is separate from a computing platform on which the DIAMETER routing agent is located.

17. The system of claim 12 wherein modifying the DIAMETER signaling message to include results from or derived from the access to the number portability database includes inserting the routing number (RN) identifying a ported-to network in the DIAMETER signaling message.

18. A system for providing number portability correction to communications involving a subscriber of a communications network, the system comprising:
   a DIAMETER routing agent comprising:
      a DIAMETER routing module configured for receiving a DIAMETER signaling message from a network node providing a network service to the subscriber and directed to an Online Charging System (OCS), wherein the DIAMETER signaling message includes a called party identifier and a calling party identifier and routing DIAMETER signaling messages; and
      a number portability correction module, configured for:
         in response to receiving the DIAMETER signaling message, accessing a number portability database to determine whether the called party identifier has been ported; and
      a subscriber comparison module, configured for:
         determining whether the called party and the calling party are subscribers of the same communications network; and
         in response to determining that the called party and the calling party are subscribers of the same communications network, responding to the network node to continue providing service to the subscriber.

19. The system of claim 18 wherein receiving a DIAMETER signaling message includes receiving a DIAMETER credit control request (CCR) message.

20. The system of claim 18 wherein the DIAMETER routing agent comprises at least one of a DIAMETER signaling router, a DIAMETER redirect agent, a DIAMETER proxy agent, and a DIAMETER translation agent.

21. The system of claim 18 wherein the number portability database is located on the same computing platform as the DIAMETER routing agent.

22. The system of claim 18 wherein the number portability database is located on a computing platform that is separate from a computing platform on which the DIAMETER routing agent is located.

23. A system for using DIAMETER messaging to trigger a number portability lookup, the system comprising:
   a DIAMETER routing agent comprising:
      a DIAMETER routing module configured to receive a DIAMETER request message and trigger a number portability lookup in response to receiving the DIAMETER signaling message; and
      a number portability correction module configured to perform the number portability lookup in response to receiving the DIAMETER signaling message and to return number portability information, wherein the DIAMETER routing module formulates a DIAMETER answer message in response to the DIAMETER request message, includes the number portability information or information derived from the number portability information in the DIAMETER answer message, and forwards the DIAMETER answer message.

24. The system of claim 23 wherein the DIAMETER request message comprises a credit control request message and wherein the DIAMETER answer message comprises a credit control answer message.

25. The system of claim 23 wherein the number portability correction module is configured to insert the number portability information in the DIAMETER answer message.

26. The system of claim 23 wherein the number portability correction module is configured to insert information derived from the number portability information in the DIAMETER answer message.

27. A non-transitory computer readable medium having stored thereon executable instructions that when executed by the processor of a computer control the computer to perform steps comprising:
   at a DIAMETER routing agent:
      receiving a DIAMETER signaling message from a network node providing a network service to a subscriber and directed to an Online Charging System (OCS), wherein the DIAMETER signaling message includes a called party identifier;
      accessing a number portability database to determine whether the called party identifier has been ported;
      in response to determining that the called party identifier has been ported, modifying the DIAMETER signaling message to include results from or derived from the access to the number portability database, wherein modifying the DIAMETER signaling message to include results from or derived from the access to the number portability database includes translating a routing number obtained in the access to the number portability database into a destination realm identifier and inserting the destination realm identifier in the DIAMETER signaling message; and
      routing the modified DIAMETER signaling message to the OCS.

28. A non-transitory computer readable medium having stored thereon executable instructions that when executed by the processor of a computer control the computer to perform steps comprising:
   at a DIAMETER routing agent:
      receiving a DIAMETER signaling message from a network node providing a network service to a subscriber and directed to an Online Charging System (OCS), wherein the DIAMETER signaling message includes a called party identifier and a calling party identifier;
      in response to receiving the DIAMETER signaling message, accessing a number portability database to determine whether the called party identifier has been ported;
      determining whether the called party and the calling party are subscribers of the same communications network; and
      in response to determining that the called party and the calling party are subscribers of the same communications network, responding to the network node to continue providing service to the subscriber.

* * * * *